United States Patent
Tsuji et al.

(10) Patent No.: US 8,574,484 B2
(45) Date of Patent: Nov. 5, 2013

(54) RTM METHOD AND METHOD FOR MANUFACTURING FIBER-REINFORCED RESIN MOLDED BODY

(75) Inventors: Seiji Tsuji, Nagoya (JP); Hidehiro Takemoto, Tokyo (JP); Masaaki Yamasaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 108 days.

(21) Appl. No.: 13/145,870

(22) PCT Filed: Jan. 27, 2010

(86) PCT No.: PCT/JP2010/051022
§ 371 (c)(1),
(2), (4) Date: Jul. 22, 2011

(87) PCT Pub. No.: WO2010/087361
PCT Pub. Date: Aug. 5, 2010

(65) Prior Publication Data
US 2011/0272853 A1 Nov. 10, 2011

(30) Foreign Application Priority Data
Jan. 29, 2009 (JP) .................................. 2009-017793

(51) Int. Cl.
*B29C 45/14* (2006.01)

(52) U.S. Cl.
USPC ..................... 264/328.16; 264/40.6; 264/257; 264/334

(58) Field of Classification Search
USPC ............................ 264/40.6, 257, 328.16, 334
See application file for complete search history.

(56) References Cited

U.S. PATENT DOCUMENTS

2004/0130072 A1 7/2004 Sekido
2007/0182071 A1 8/2007 Sekido

FOREIGN PATENT DOCUMENTS

| JP | 61-84212 | * | 4/1986 |
| JP | 61084212 | | 4/1986 |
| JP | 04151211 | | 5/1992 |
| JP | 04151212 | * | 5/1992 |
| JP | 2003048223 | | 2/2003 |
| JP | 2003053744 | | 2/2003 |
| JP | 2005169786 | | 6/2005 |
| JP | 2006-95727 | * | 4/2006 |
| JP | 2006095727 | | 4/2006 |
| JP | 2007007910 | | 1/2007 |
| JP | 2009051208 | | 3/2009 |
| WO | 2005077632 | | 8/2005 |

OTHER PUBLICATIONS

International Search Report for PCT/JP2010/051022 mailed Mar. 2, 2010.

* cited by examiner

*Primary Examiner* — Christina Johnson
*Assistant Examiner* — Saeed Huda
(74) *Attorney, Agent, or Firm* — RatnerPrestia

(57) ABSTRACT

Provided is a RTM method wherein a molding die composed of a temperature control mechanism, which is arranged on at least one of a plurality of dies that form a molding die and adjusts the temperature of the die, and a valve mechanism, which starts and stops supply of a resin in a state of having fluidity to the cavity of the molding die, is used. In the method, a plurality of the valve mechanisms are arranged on the molding die, each of the valve mechanisms is provided with one or a plurality of temperature control systems which adjust the temperature of the valve mechanism, the resin in the state of having fluidity is supplied to the cavity from the valve mechanisms, and a reinforcing fiber base material contained in the cavity is impregnated with the resin.

13 Claims, 4 Drawing Sheets

RTM METHOD AND METHOD FOR MANUFACTURING FIBER-REINFORCED RESIN MOLDED BODY

CROSS-REFERENCE TO RELATED APPLICATIONS

This application is the U.S. National Phase application of PCT International Application No. PCT/JP2010/051022, filed Jan. 27, 2010, and claims priority to Japanese Patent Application No. 2009-017793, filed Jan. 29, 2009, the disclosure of which PCT and priority applications are incorporated herein by reference in their entirely for all purposes.

FIELD OF THE INVENTION

The invention relates to a RTM (Resin Transfer Molding) process for producing a fiber reinforced plastic (FRP) molding, and in particular, relates to a RTM process to produce a molding having high surface quality while carrying out an efficient step of injecting a resin into a molding die. The invention also relates to a fiber reinforced plastic molding production method to produce a fiber reinforced plastic molding using the RTM process.

BACKGROUND OF THE INVENTION

An FRP, particularly a carbon fiber reinforced plastic (CFRP), has come in increasingly wide use as lightweight composite material having good mechanical characteristics. A known FRP molding process comprises placing a prepreg, which is an intermediate material comprising a reinforcement fiber base impregnated with a resin, on a mold, and solidifying the resin impregnated in the reinforcement fiber base in an autoclave. Commonly, more than one prepreg sheet is piled up on the mold.

In a RTM process recently coming in wider use, however, a reinforcement fiber base comprising a woven fabric of reinforcement fibers is placed on a mold, closing a molding die, reducing the pressure in the molding die, and injecting a thermosetting resin in a flowable state or a thermoplastic resin in a flowable state into a cavity of the molding die to impregnate the reinforcement fiber base with the resin, followed by solidification of the resin (Patent Literature 1). This serves to produce high quality moldings in a short molding cycle. In cases where the resin is a thermosetting resin, the term "curing" is often used instead of the term "solidification."

In this RTM process, a resin used to produce a molding is left and solidified at or in the vicinity of a resin injection port to the cavity of the molding die, leading to the problem of requiring a long time to remove it. To solve this problem, it has been proposed to inject the resin into the cavity through a resin tube placed at between registering surfaces of two or more molds in the molding die, and squeeze the resin tube by closing the two or more molds after the injection of the resin. When the molded product is taken out from the molding die after molding the product, the resin tube that contains solidified resin remaining inside is also removed for disposal. A new resin tube is used in the next molding cycle. This process has been proposed as a means of shortening the molding cycle by eliminating a cleaning step of the molding die (Patent Literature 2).

When using this process, however, the resin tube cannot be reused for the next resin injection because the tube pressed between the two or more molds contains resin solidified by the heat received from the molding die. Consequently, additional operations for exchange the resin tube and remove the used resin tube are required for each molding cycle, which will pose a problem. Furthermore, the resin tube for injecting resin into the cavity can be placed only to the registering surfaces of the two or more molds in the molding die. In the case of producing a molding having a shape that requires a long flow distance, for instance, a molding having a large surface, it will be difficult to shorten the step of impregnating a reinforcement fiber base with a resin, which will also pose a problem.

Patent Literature

Patent Literature 1: JP 2007-007910 A.
Patent Literature 2: JP 2005-169786 A.

SUMMARY OF THE INVENTION

In view of the above-mentioned problems in the conventional techniques, the present invention aims to provide a RTM process for production of fiber reinforced plastic moldings having high surface quality that allows resin injection into an internal portion (i.e. a cavity) of a molding die to be performed without using a throwaway resin tube in carrying out RTM operations so that the next resin injection cycle can be performed without exchanging the resin tube or removing the used resin tube before starting the next resin injection cycle.

The present invention also aims to provide a RTM process that uses a molding die in which a resin injection port is provided on at least one of two or more molds at a position other than registering surfaces between the two or more molds in the molding die so that impregnation of a reinforcement fiber base in a cavity with a resin can be carried out in a shorter period of time even in the case of a molding having a large surface area.

Furthermore, the present invention also aims to provide a fiber reinforced plastic molding production method that uses the RTM process according to exemplary embodiments of the invention to produce fiber reinforced plastic moldings.

A RTM process according to exemplary embodiments of the invention is as described below.

A RTM process comprising:

using a molding die comprising (a) two or more molds, (b) a temperature control mechanism provided in at least one of the two or more molds to adjust a temperature of the mold, (c) a mold opening-closing mechanism to open and close the two or more molds, (d) a cavity between the inner walls of the two or more molds formed when the two or more molds are closed, (e) a resin introducing path to supply a resin in a flowable state into the cavity, and (f) a valve mechanism provided in the resin introducing path to start and stop the supply of the resin into the cavity through the resin introducing path;

(g) activating the mold opening-closing mechanism to close the two or more molds after a reinforcement fiber base is placed in the cavity;

(h) supplying the resin into the cavity through the resin introducing path and the valve mechanism after the two or more molds are closed;

(i) activating the valve mechanism to stop the supply of the resin after the supply of the resin is completed;

(j) activating the temperature control mechanism for adjustment of the temperature in the cavity by so as to solidify the resin impregnated in the reinforcement fiber base placed in the cavity; and (k) activating the mold opening-closing mechanism to open the two or more molds after the solidification of the resin is completed to allow a molded fiber reinforced plastic molding comprising the reinforcement fiber base and the resin to be ejected from the molding die; wherein:

(l) two or more valve mechanisms each of which is said valve mechanism are provided in the molding die, (m) one or more temperature control systems are provided for each of the two or more valve mechanisms to adjust the temperature of the valve mechanisms, and (n) the resin in a flowable state is supplied to the cavity through the two or more valve mechanisms.

For the RTM process, it is preferable that a temperature controlling medium is continued to flow in at least one of the one or more temperature control systems provided for each of the valve mechanisms so that the resin in a flowable state remaining in the resin introducing path is kept flowable while the resin is not flowing in the resin introducing path even during the solidification of the resin in a flowable state in the cavity.

For the RTM process, it is preferable that the top end portion of each valve mechanism, the top end portion being a part of the valve mechanism, is embedded in one of the molds, that the resin introducing path leading to the cavity via the valve mechanism passes through the mold so that it has its open end in the inner wall surface of the cavity, and that at least one of the one or more temperature control systems provided for the valve mechanism is located between the top end portion of the valve mechanism and a resin retention portion of the resin introducing path where the resin in a flowable state is retained during the period when the resin is not flowing in the resin introducing path.

For the RTM process, it is preferable that the system located between the resin retention portion and the top end portion of the valve mechanism is one serving to cause the temperature controlling medium to flow through a temperature controlling medium flow channel provided in the valve mechanism so that the valve mechanism is cooled by the temperature controlling medium.

For the RTM process, it is preferable that the top end portion of the valve mechanism is provided with another temperature control system and that the another temperature control system serves to heat the valve mechanism.

For the RTM process, it is preferable that the diameter d and the depth h of the top end portion of the valve mechanism meet the following relation:

$$d \leq h.$$

For the RTM process, it is preferable that the two or more valve mechanisms can be opened and closed independently.

For the RTM process, it is preferable that, of the temperature control mechanisms provided in the molding die, those temperature control mechanisms located around the top end portion of the valve mechanism belong to a temperature control mechanism other than the system that those in the other regions belong to.

For the RTM process, it is preferable that of the temperature control mechanisms provided in the molding die, those temperature control mechanisms located around the top end portion of the valve mechanism are arranged so that they surround the top end portion of the valve mechanism in the molding die.

For the RTM process, it is preferable that the temperature control mechanisms provided in the molding die are arranged so that their distances, L, from the interface between the top end portion of the valve mechanism and the mold meet the following relation:

$$L \leq 30 \text{ mm}.$$

For the RTM process, it is preferable that two or more of the resin introducing paths covering the two or more valve mechanisms are connected to the same resin supply source and that a resin temperature control mechanism is provided in each of the two or more resin introducing paths connecting a resin supply source and the valve mechanisms to adjust the resin temperature to a value higher than the temperature of the resin entering the cavity so that the resin in the resin introducing paths is properly controlled by the resin temperature control mechanisms.

For the RTM process, it is preferable that the reinforcement fiber base is in a form of sheet.

For the RTM process, it is preferable that the reinforcement fiber base has a core in its interior.

For the RTM process, it is preferable that a media for forming a resin flow channel in the cavity is provided between the reinforcement fiber base and the position of the open end of the resin introducing path in the inner wall surface of the mold.

For the RTM process, it is preferable that the media has a thickness of 0.2 to 1 mm.

A production method for a fiber reinforced plastic molding according to exemplary embodiments of the invention is as described below.

A fiber reinforced plastic molding production method to produce a fiber reinforced plastic molding by carrying out the RTM process of exemplary embodiments of the invention.

If the RTM process according to the invention is used, undesirable solidification of liquid-state resin (resin in a flowable state) in the resin injection path can be prevented as the liquid-state resin is injected in the molding die for solidification of the resin in the molding die, making it possible to perform desirable smooth resin injection operations and allow smooth motions for starting and stopping the resin injection. As the solidification of the injection resin can be prevented, resin flow channels can be opened and closed without using throwaway resin feed tubes. As a result, the entire workability of the molding cycle can be improved and the productivity for production of moldings can be enhanced. It is also possible to reduce the amount of wastes including resin feed tubes used in the conventional processes.

The use of this RTM process allows the resin to be injected smoothly into the cavity of the molding die, and in the case of repeating the molding cycle, allows the tact time to be shortened, leading to a large increase in the efficiency of production of FRP moldings.

To refer to the solidification of resin, the term "curing" is commonly used for thermosetting resins while the term "setting" or "solidification" is commonly used for thermoplastic resins.

DETAILED DESCRIPTION OF THE INVENTION

Figure 1:
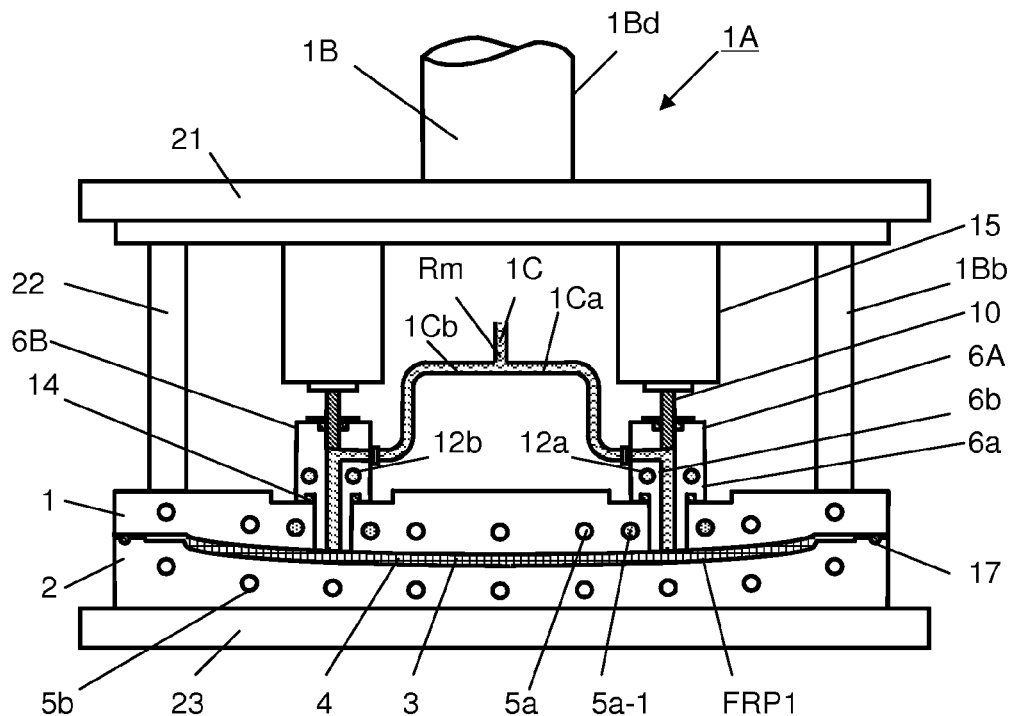
FIG. 1 is a schematic cross sectional front view of part of an embodiment of the molding die used to carry out the RTM process of the invention.

An embodiment of the molding die used to carry out the RTM process of the invention is shown in FIG. 1. A molding die 1A given in FIG. 1 has two or more molds, for instance, a top mold 1 and a bottom mold 2. Of the two or more molds, e.g. mold 1 and mold 2, at least one, for example, the top mold 1, contains a temperature control mechanism 5a to adjust the temperature of the mold. In the present embodiment, a temperature control mechanism 5b is also provided in the interior of the bottom mold 2. These temperature control mechanisms 5a and 5b are constructed of, for instance, a medium flow channel embedded in the top mold 1 to allow a temperature controlling medium to flow or a temperature-controllable electric heating device (for instance, electric heater).

The temperature control mechanisms 5a and 5b shown in FIG. 1 are constructed of a medium flow channel that allows a temperature controlling medium to flow. The medium flow channel is used to pass a circulating medium supplied from a medium supply apparatus installed outside the molding die 1A. The medium may be heated or cooled according to the purpose. The medium may be, for instance, water or oil.

The molding die 1A has a mold opening-closing mechanism 1B to open and close the two or more molds 1 and 2. The mold opening-closing mechanism 1B comprises a lower lift unit 23 fixed to the bottom mold 2, columns 22 fixed to the top mold 1, an upper lift unit 21 fixed to the top of the columns 22, and a lift mechanism 1Bd fixed to the upper lift unit 21 to move up or down the upper lift unit 21. In the present embodiment, the lower lift unit 23 is firmly fixed to the base (not shown in the figures) of the molding die 1A and does not move in the vertical direction. Accordingly, the bottom mold 2 is also firmly fixed in place. The top mold 1 is moved up and down by the lift mechanism 1Bd to come in and out of contact with the bottom mold 2. Thus, the top mold 1 and the bottom mold 2 open and close between the two molds. An O-ring 17 for sealing is provided on the upper surface of the bottom mold 2, that is, the registering face between the top mold 1 and the bottom mold 2.

Two or more valve mechanisms are provided on the molding die 1A to start and stop the supply of a resin in a flowable state (flowable resin) to a cavity 3. In the present embodiment, two or more valve mechanisms 6A and 6B are provided on the top mold 1 to start and stop the supply of the resin in a flowable state (flowable resin) to the cavity 3. Unlike the configuration shown in the figures, the two or more valve mechanisms may be provided separately on the top mold 1 and the bottom mold 2.

In this embodiment, each of the valve mechanisms 6A and 6B comprises a main valve device 6a in a cylindrical form, a resin flow channel 6b provided inside the main valve device 6a, and a valve, for instance a piston 10, to start and stop the flow of the resin through the resin flow channel 6a.

Figure 2:
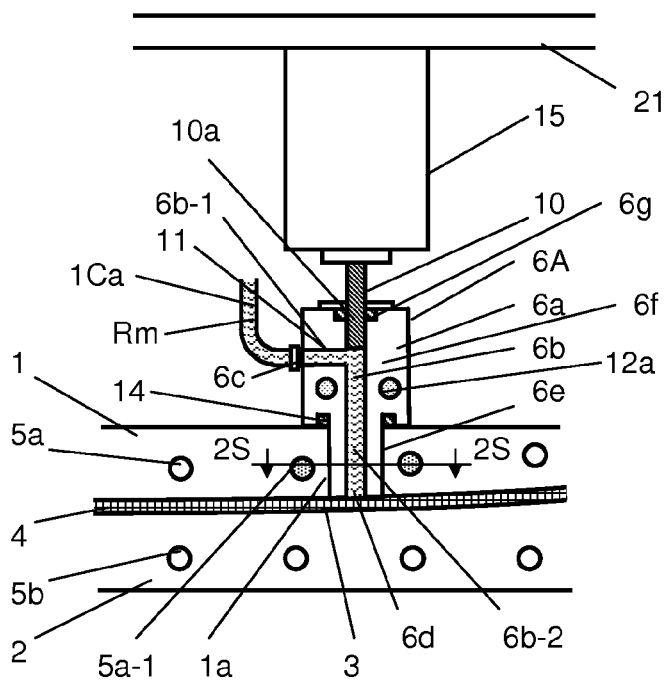
FIG. 2 is an enlarged schematic cross sectional front view of part of the resin flowing through the resin introducing path (in a state that the introducing path is opened) in a valve mechanism in the molding die shown in FIG. 1.
Figure 3:
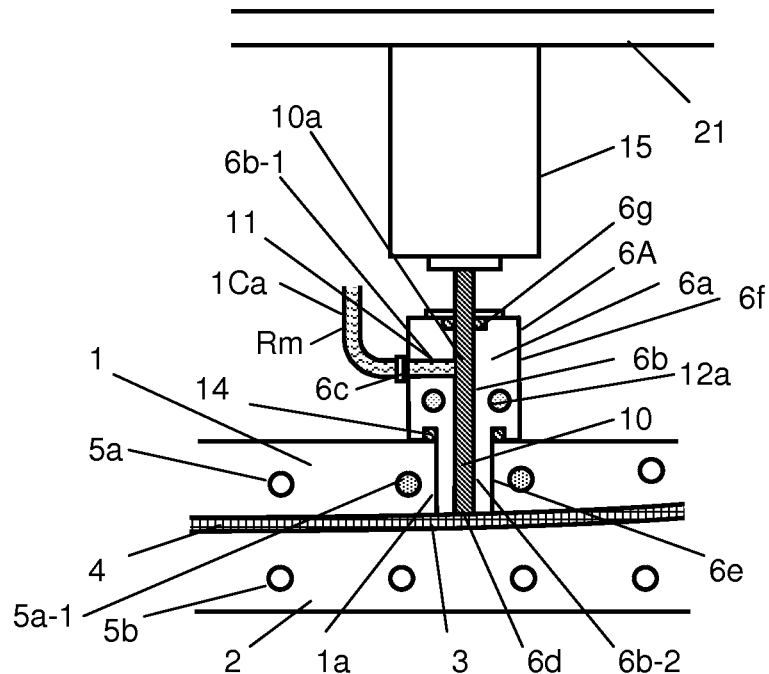
FIG. 3 is an enlarged schematic cross sectional front view of part of resin as shown in FIG. 2 but staying without flowing in the resin introducing path (in a state that the introducing path is closed) in the valve mechanism.

FIGS. 2 and 3 show enlargements of the valve mechanisms 6A given in FIG. 1. FIG. 2 is an enlarged schematic cross sectional front view of part of the resin flowing through the resin flow channel 6b (in a state that the flow channel is opened) in the valve mechanism 6A in the molding die 1A shown in FIG. 1. FIG. 3 is an enlarged schematic cross sectional front view of part of resin as shown in FIG. 2 but staying without flowing in the resin flow channel 6b (in a state that the flow channel is closed) in the valve mechanism 6A.

The main valve device 6a has a piston rod hole 10a penetrating it from the top face to the bottom face. The piston 10 is attached to the main valve device 6a in such a manner that it can move up and down through the piston rod hole 10a. The top end of the piston 10 is fixed to a piston drive apparatus 15. The piston drive apparatus 15 is fixed to the bottom face of the upper lift unit 21.

The resin flow channel 6b provided inside the main valve device 6a has an inlet 6c in the side face of the main valve device 6a. Its outlet 6d is in the bottom face of the main valve device 6a. The resin flow channel 6b comprises a resin flow channel 6b-1 extending in the horizontal direction and a resin flow channel 6b-2 connected to the former and extending in the vertical direction. This vertical resin flow channel 6b-2 partially coincides with the piston rod hole 10a. Accordingly, the piston 10 moving down to close the horizontal resin flow channel 6b-1 works to stop the supply of resin to the cavity 3 through the horizontal resin flow channel 6b-1 and the vertical resin flow channel 6b-2. While the supply of resin is suspended, the resin flow channel 6b-1 is referred to as the resin retention portion 11 where the resin is retained.

The top end portion 6e of the main valve device 6a is embedded in the top mold 1 after being inserted in the valve mechanism attaching hole 1a that penetrates through the top mold 1 from the top face to the inner wall surface. The upper portion of the main valve device 6a above the top end portion 6e, which is referred as the rear end portion 6f of the main valve device 6a, is exposed above the top face of the top mold 1. The outside diameter of the rear end portion 6f is larger than that of the top end portion 6e, forming a step between them. An O-ring 14 for sealing is provided between the bottom face of the rear end portion 6f and the top face of the mold 1. An O-ring 6g for sealing is also provided around the upper open end of the piston rod hole 10a.

The resin flow channel 6b-1 (resin retention portion 11) is contained in the rear end portion 6f of the main valve device 6a, which is above the top end portion 6e of the main valve device 6a, and is likely to be influenced by the heat of the top mold 1 because the top end portion 6e is embedded in the top mold 1. Specifically, in the case where the resin is a thermosetting resin, the thermosetting resin is cured in the cavity 3, and the temperature control mechanisms 5a and 5b adjust the temperature to cure the thermosetting resin. Accordingly, the heat correspond to the temperature is transferred to the resin retention portion 11 through the top end portion 6e of the main valve device 6a, possibly working to cure the resin retained in the resin retention portion 11.

In the case where the resin is a thermoplastic resin, on the other hand, the thermoplastic resin is solidified in the cavity 3, and the temperature control mechanisms 5a and 5b adjust the temperature to solidify the thermoplastic resin. Accordingly, the heat correspond to the temperature is transferred to the resin retention portion 11 through the top end portion 6e of the main valve device 6*a*, possibly working to solidify the resin retained in the resin retention portion 11.

To minimize the possibility for this to take place, one or more temperature control systems 12*a* and 12*b* are provided on each of the two or more valve mechanisms 6A and 6B in the molding die 1A to control their temperatures to maintain the flowability of the resin in the resin retention portion 11 so that the supply of the resin to the cavity 3 can be started immediately after the beginning of the next molding cycle. Each of the temperature control systems 12*a* and 12*b* is constructed of a medium flow channel embedded in the main valve device 6*a* to allow the temperature controlling medium to flow or a temperature controllable electric heating device (for instance, electric heater).

The temperature control systems 12*a* and 12*b* shown in FIG. 1 are constructed of a medium flow channel that allows a temperature controlling medium to flow. The medium flow channel is used to pass a circulating medium supplied from a medium supply apparatus installed outside the valve mechanisms 6A and 6B. The medium may be heated or cooled according to the purpose. The medium may be, for instance, water or oil.

In the molding die 1A, a resin supply branch pipe 1Ca to feed the resin Rm in a flowable state is connected to the resin inlet 6*c* of the main valve device 6*a* of the valve mechanism 6A, while a resin supply branch pipe 1Cb to feed the resin Rm in a flowable state is connected to the resin inlet of the valve mechanism 6B which has a similar structure to the valve mechanism 6A, with these resin supply branch pipes 1Ca and 1Cb connected to a resin supply main pipe 1C on their upstream side. The resin supply main pipe 1C is connected to a supply source (not shown in the figures) of the resin Rm in a flowable state.

In the molding die 1A, a reinforcement fiber base 4 is first introduced to the cavity 3, and then the two or more molds 1 and 2 are closed by the mold opening-closing mechanism 1B. After the two or more molds 1 and 2 are closed, the resin Rm is supplied to the cavity 3 through the resin supply branch pipe 1Ca and the valve mechanism 6A. Similarly, the resin Rm is supplied to the cavity 3 through the resin supply branch pipe 1Cb and the valve mechanism 6B. After the supply of the resin Rm into the cavity 3 is completed, the supply of the resin Rm is stopped by the valve mechanisms 6A and 6B. Simultaneously or subsequently, the temperature in the cavity 3 is adjusted by the temperature control mechanisms 5*a* and 5*b* in order to solidify the resin Rm impregnated in the reinforcement fiber base 4 in the cavity 3. After the solidification of the resin Rm is completed, the two or more molds 1 and 2 are opened by the mold opening-closing mechanism 1B, and the fiber reinforced plastic molding FRP1 comprising the reinforcement fiber base 4 and the solidified resin is ejected from the molding die 1A.

In the molding die 1A used for this RTM process, two or more valve mechanisms are contained in the molding die 1A. Depending on the size of the molding die used, the molding die 1A shown in FIG. 1 contains the valve mechanisms 6A and 6B, which have the same configuration, located at the same distance to the right and left of the center of the top mold 1. Additional valve mechanisms will be installed in the top mold 1 when a molding having a larger surface area is to be produced. Additional valve mechanisms will be also installed in the bottom mold 2 when a molding having a larger thickness is to be produced.

In the molding die 1A used for this RTM process, one or more temperature control systems 12*a* are provided in one of the valve mechanism 6A to control the temperature of the valve mechanism 6A. In addition, one or more temperature control systems 12*b* are provided in the other valve mechanism 6B to control the temperature of the valve mechanism 6B.

There are no particular requirements on the material of the molds 1 and 2 of the molding die 1A as long as the cavity 3 can be created to shape, but the use of a metal material is preferable because the temperatures of the molds 1 and 2 will be controlled efficiently by temperature control mechanisms 5*a* and 5*b*. Examples of the metal include, for instance, aluminum, steel, and zinc alloy.

In view of the heat transfer and other factors, the main valve device 6*a* of the valve mechanisms is preferably made of metal. It is preferable that the wall surface of the piston rod hole 10*a* and the surface of the piston 10 are surface-treated to prevent abrasion of the surfaces and adhesion of solidified resin. Examples of the surface treatment include, for instance, nitriding treatment.

To close the flow channel, the piston 10 should preferably be designed so that its end reaches the end of the piston rod hole 10*a* (i.e. the end of the resin flow channel 6*b*-2) or the inner wall surface of the top mold 1 to allow the end of the piston 10 and the wall surface of the cavity 3 to form a continuous plane, which serves to prevent a mark of the piston rod hole 10*a* (resin flow channel 6*b*-2) from being left on a surface of the resulting fiber reinforced plastic molding.

The at least one temperature control system for the valve mechanisms is preferably installed between the resin retention portion 11 in the rear end portion 6*f* and the top end portion 6*e*. This serves to efficiently prevent the heat of the portion of the main valve device 6*a* embedded in the mold 1 (i.e. the top end portion 6*e*) from influencing the resin retention portion 11. Specifically, if the embedded portion (the top end portion 6*e*) receiving heat from the molding die has nearly the same temperature as the molding die, this temperature control system can prevents the transfer of heat of the embedded portion (the top end portion 6*e*) to allow the resin retention portion 11 to be maintained at temperature where the resin is flowable. Thus, the resin in the resin flow channel 6*b*-1 will not be solidified (cured) to block the flow channel, and removal of solidified resin will not be necessary, making it possible to immediately start the next molding cycle. Thus, moldings will be produced continuously with high productivity.

In the case where the resin is a thermosetting resin, in particular, the molding die is heated to promote the curing the supplied resin, and the embedded portion of the valve mechanisms that is in contact with the molding die receives heat from the molding die and has a high temperature. As the embedded portion has a high temperature, heat tends to be transferred to other portions of the valve mechanisms to cause the entire valve mechanisms to be heated to a high temperature. The installation of the temperature control system between the resin retention portion and the portion of the valve mechanisms embedded in the molding die is preferable because this problem can be solved as the valve mechanisms are cooled to prevent heat transfer from the embedded portion, thereby maintaining the resin retention portion at a low temperature and preventing the curing reaction of the resin.

This cooling functionality of the temperature control system, however, can act to cool the portion of the valve mechanisms embedded in the molding die, in turn cooling the peripheral portion of the molding die that is in contact with the embedded portion. If the inner wall surface of the mold that forms the cavity is cooled, a longer cure time will be needed for the resin or its curing will not achieved appropriately, leading to deterioration in the surface quality of the resulting fiber reinforced plastic molding.

If this problem occurs and needs to be solved, it is preferable that another temperature control system 13 is installed in the portion of the valve mechanisms embedded in the molding die. In the embodiment shown in FIG. 4, such an additional temperature control system 13 is installed in the valve mechanism. Except for the portion that contains the additional temperature control system 13, the valve mechanism 46A shown in FIG. 4 has the same configuration with the valve mechanism 6A shown in FIG. 2. The components shown in FIG. 4 that correspond to those shown in FIG. 2 are indicated by the same component numbers as those in FIG. 2.

Figure 4:
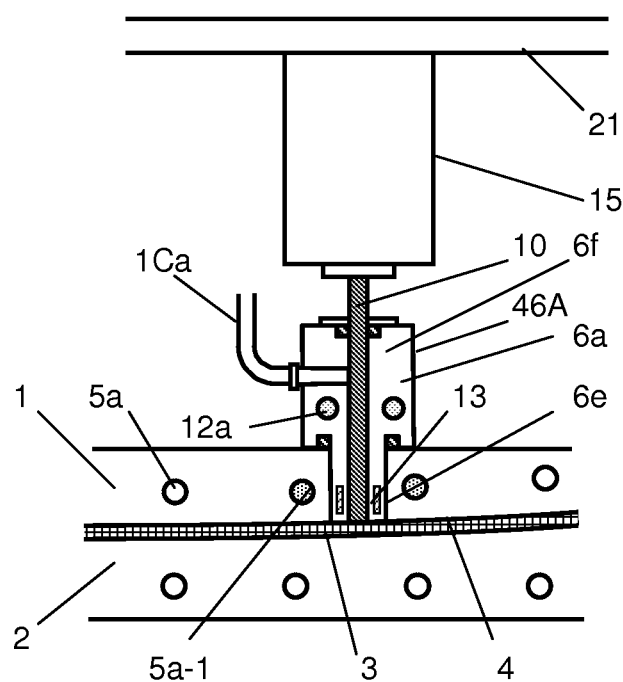
FIG. 4 is a schematic cross sectional front view of part of the resin staying without flowing in the resin introducing path (in a state that the introducing path is closed) in another embodiment of the valve mechanism of the molding die shown in FIG. 1.

In the valve mechanism 46A shown in FIG. 4, the temperature control system 13 is designed to heat the top end portion 6e of the valve mechanism 46A. Heating the embedded portion (the top end portion 6e) in the molding die serves to prevent a temperature fall in the inner wall surface of the mold 1 that forms the cavity 3. This prevents a lengthened resin cure time or deterioration in the surface quality of the resulting molding.

The temperature control system 13 is embedded in the top end portion 6e in FIG. 4, but it may be installed on the outside surface of the top end portion 6e or on the piston 10. The temperature control system 13 may be constructed of a medium flow channel that allows a heating medium to pass, and the heating medium may be, for instance, water, steam, or oil. Or it may be constructed of an electric heater that heats the relevant portions when activated. The use of an electric heater as the temperature control system 13 is preferable because it requires a smaller space for installation, and serves to minimize the size of the valve mechanisms.

Figure 5:
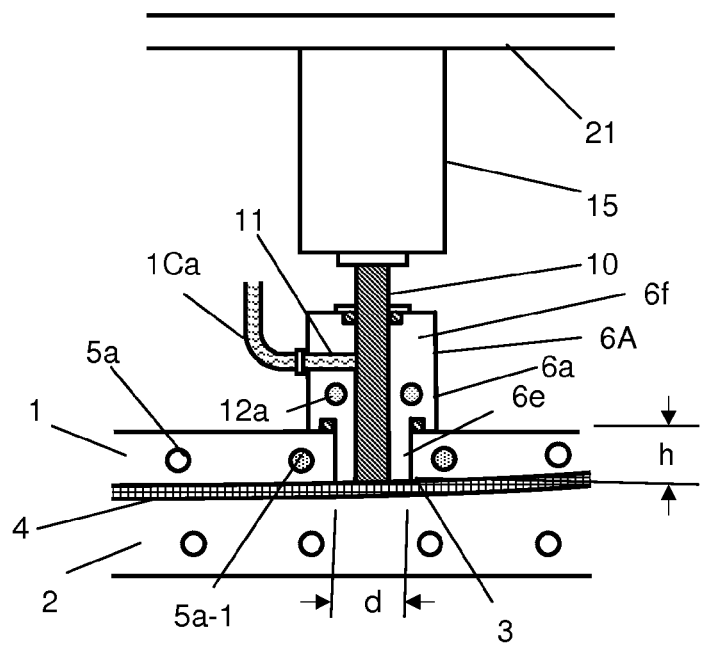
FIG. 5 is a schematic cross sectional front view of part of a valve mechanism where preferable sizes are added to the valve mechanism shown in FIG. 3.

The diagram of a valve mechanism shown in FIG. 5 includes preferable sizes of major components of the top end portion 6e of the valve mechanism 6A shown in FIG. 3. In FIG. 5, the portion of the valve mechanisms 6A embedded in the molding die (the top end portion 6e) has a diameter of d (mm) and is inserted in the mold 1 to a depth of h (mm). It is preferable that the diameter d and the depth h have the following relation: d≤h.

The top end portion 6e is temperature-controlled by the temperature control system 12a provided between the resin retention portion 11 and the top end portion 6e and receives heat from the mold 1. When the diameter d (mm) is large, the temperature control system 12a can cool the top end portion 6e efficiently, while heat from the mold 1 will not be transferred sufficiently to the central portion of the top end portion 6e, leading to a decrease in the temperature of the center portion. In addition, the peripheral portion of the top end portion 6e in the mold 1 can easily suffer a fall in temperature as it is cooled by the temperature control system 12a. As a result, this leads to a lengthened resin cure time or inferior curing to cause deterioration in the surface quality of the resulting molding.

If the relation of d≤h is maintained, the top end portion 6e has a relatively large contact area with the mold 1 as compared with the diameter d (mm), and the temperature control system 12a has difficulty in cooling the entire top end portion 6e. In addition, the portion of the mold 1 in contact with the top end portion 6e will not be cooled significantly by the temperature control system 12a, and the inner wall surface of the mold 1 that forms the cavity 3 will not suffer a significant fall in temperature, enabling efficient curing of the resin and quick production of moldings having high surface quality. It is preferable that the apical surface of the portion of the valve mechanism embedded in the force (the top end portion) is flush with the inner wall surface of the mold that forms the cavity.

The two or more valve mechanisms may be provided in any of the two or more molds that form the molding die. Such two or more valve mechanisms provided in the molding die serves for a large reduction in the time required to impregnate a reinforcement fiber base with resin because resin can be injected in the cavity efficiently from the two or more valve mechanisms even when the cavity has a large surface area. The two or more valve mechanisms may be installed together in one mold or separately in two or more molds. Furthermore, the resin flow channels in each valve mechanism may be opened and closed simultaneously or independently according to the state of resin impregnation in the reinforcement fiber base in the cavity.

It is preferable that the temperature control mechanisms provided around the portion of the valve mechanism embedded in the mold (the top end portion of the valve mechanism) and those in the other portions of the molding die belong to different temperature control systems. This embodiment is described below with reference to the diagrams of the molding die shown in FIGS. 1 and 2. Specifically, in this embodiment, the region around the top end portion 6e of the valve mechanism 6A in the mold 1 is temperature-controlled by the temperature control mechanism 5a-1 that is different from the temperature control mechanism 5a, while the other region is temperature-controlled by the temperature control mechanism 5a.

To prevent the resin in the resin retention portion to be cured, the valve mechanism is controlled by temperature control systems at a temperature where the resin will not be cured. On the other hand, the molding die is controlled by temperature control mechanisms at a temperature where the resin is cured rapidly and sufficiently. In the region around the embedded portion of the valve mechanism, the temperature of the valve mechanism can influence that of the surrounding region to cause the temperature of the surrounding region deviate from the optimum temperature for curing of the resin. If the region around the embedded portion of the valve mechanism and the general region of the molding die are temperature-controlled by temperature control mechanisms belonging to different systems, optimum temperatures for curing of the resin can be achieved at different positions. The general region refers to the region that is not influenced by the temperature distribution caused by the valve mechanism and is roughly 50 mm or more away from the center of the valve mechanism in the inner wall surface of the mold that forms the cavity.

Figure 6:
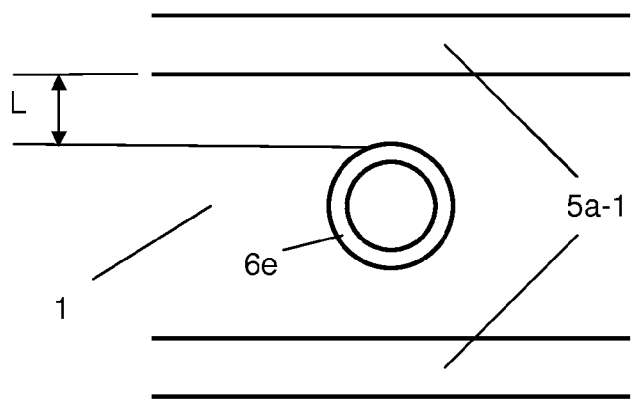
FIG. 6 is a schematic plan view of the cross section of the vicinity of the top end portion of the valve mechanism taken along by 2S-2S arrows in FIG. 2, illustrating the positional relation between the temperature control mechanism and the top end portion of the valve mechanism.
Figure 7:
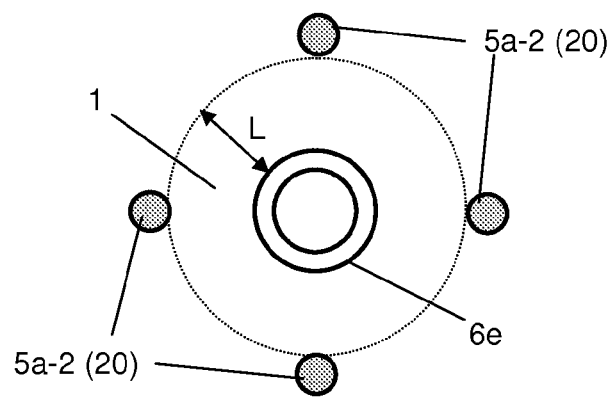
FIG. 7 is a schematic plan view of another embodiment of the temperature control mechanism shown in FIG. 6.
Figure 8:
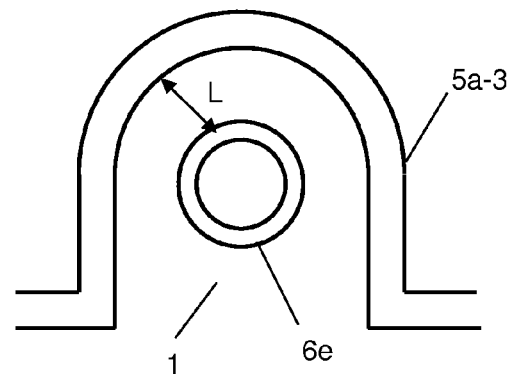
FIG. 8 is a schematic plan view of still another embodiment of the temperature control mechanism shown in FIG. 6.

The temperature control mechanisms belonging to the system for the region around the embedded portion of the valve mechanism are preferably arranged in the molding die so that they surround the region around the embedded portion of the valve mechanism. Examples of this embodiment are shown in FIGS. 6, 7, and 8. The arrangement of the temperature control mechanisms surrounding the region around the embedded portion of the valve mechanism serves to maintain the inner wall surface of the mold 1 in the region around the embedded portion of the valve mechanism at or near the temperature of the cavity 3.

In FIG. 6, two parallel temperature control mechanisms 5a-1 are provided in the mold 1 on either side of the top end portion 6e in the region around the top end portion 6e of the valve mechanism. The temperature control mechanisms 5a-1 are located with a minimum distance of L from the circumferential surface of the top end portion 6e. In FIG. 7, four temperature control mechanisms 5a-2 are arranged around the top end portion 6e in the mold 1 in the region around the top end portion 6e of the valve mechanism. The temperature control mechanisms 5a-2 are located with a minimum distance of L from the circumferential surface of the top end portion 6e. In FIG. 8, a U-shape temperature control mechanism 5a-3 is arranged around the top end portion 6e in the mold 1 in the region around the top end portion 6e of the valve mechanism. The temperature control mechanism 5a-3 is located with a minimum distance of L from the circumferential surface of the top end portion 6e.

The minimum distance L preferably meets the following relation: L≤30 mm. If the minimum distance L is more than 30 mm, the effect of the temperature control by the temperature control mechanisms in the molding die will not sufficiently reach the top end portion 6e of the valve mechanism, possibly leading to inferior curing of the resin in the cavity. If the minimum distance L is 30 mm or less, the effect of the temperature control by the temperature control mechanisms in the molding die will sufficiently reach the top end portion 6e of the valve mechanism, allowing the resin in the cavity to be cured rapidly and excellently to provide a fiber reinforced plastic molding having high surface quality. If the minimum distance L is less than 5 mm, it will be difficult to process the mold 1 to accommodate the temperature control mechanisms, leading to large equipment costs or deformation taking place during the processing to cause a gap between the mold 1 and the top end portion 6e of the valve mechanism where leakage of resin from the cavity can occur, and therefore such a distance is not preferable.

Reinforcement fibers to form the reinforcement fiber base used to carry out the RTM process include, for instance, carbon fiber, glass fiber, aramid fiber, metal fiber, boron fiber, alumina fiber, and silicon carbide fiber. These fibers may be used singly or in combination. Of these, carbon fiber is used preferably because of its good mechanical characteristics. The reinforcement fiber base may be in the form of, for instance, a sheet of reinforcement fibers oriented in one direction or a woven or nonwoven fabric of reinforcement fibers.

In addition to reinforcement fibers, a resin flow medium that promotes the flow of the resin may be contained in the interior or carried on the surface of the reinforcement fiber base. Commonly, two or more reinforcement fiber base sheets are extended over the inner wall surface of the mold to follow the shape of the cavity, or a preform prepared from a properly shaped stack of two or more reinforcement fiber base sheets is extended over the inner wall surface of the mold to follow the shape of the cavity. Generally known resin flow mediums may be used as the resin flow medium.

The RTM process according to the invention can also be used to produce fiber reinforced plastic moldings having a laminated structure comprising a fiber reinforced plastic material and a core material. Examples of such fiber reinforced plastic moldings include, for instance, a sandwich structure comprising fiber reinforced plastic layers bonded to both sides of a core material. Examples of the core material include, for instance, elastic material, foamed material, and honeycomb material. Foamed material and honeycomb material are used preferably to produce lightweight products. Examples of the foamed material include, for instance, foamed materials such as polyurethane, acrylic, polystyrene, polyimide, vinyl chloride, and phenol. Examples of the honeycomb material include, for instance, honeycomb structural members of aluminum alloy, paper, or aramid paper.

Examples of resin used preferably to carry out the RTM process according to the invention include resin inject molding (RIM) monomers for low-viscosity thermosetting or thermoplastic resin that can be easily impregnated into a reinforcement fiber base.

Examples of the thermosetting resin include, for instance, epoxy resin, unsaturated polyester resin, vinyl ester resin, phenol resin, guanamine resin, polyimide resin such as bismaleimide triazine, furan resin, polyurethane resin, polydiallyl phthalate resin, melamine resin, urea resin, and amino resin.

Examples of the thermoplastic resin include, for instance, polyamide resin such as nylon 6 resin, nylon 66 resin, and nylon 11 resin; copolyamide resin of these polyamide resins; polyester resin such as polyethylene terephthalate resin and polybutylene terephthalate resin; copolyester resin of these polyester resins; and others such as polycarbonate resin, polyamide-imide resin, polyphenylene sulfide resin, polyphenylene oxide resin, polysulfone resin, polyethersulfone resin, polyether ether ketone resin, polyetherimide resin, and polyolefin resin; as well as thermoplastic elastomer resin such as polyester elastomer resin and polyamide elastomer resin.

A blend of two or more selected from the above-mentioned thermosetting resins, thermoplastic resins, and rubbers may also be used as the resin. For production of outside plates of automobiles, particularly preferable is epoxy resin from the viewpoint of small heat shrinkage during the molding process which can have significant influence on the appearance of the products.

For common epoxy resins for composite material, such resins as bisphenol A epoxy resin, phenol novolac-type epoxy resin, and glycidyl amine-based epoxy resin are used as base resin. As curing agent, on the other hand, a combination of dicyandiamide and dichlorophenyl dimethyl urea is preferably used because of its good balance among workability, physical properties, and other characteristics. However, there are no specific limitations on them, and other substances such as diaminodiphenyl sulfone, aromatic diamine, and anhydride polyamide may also be used. The composition ratio of the resin and the reinforcement fiber base is preferably in the range of 30:70 to 70:30 by volume from the viewpoint of rigidity required for outside plates, and more preferably 40:60 to 60:40 by volume from the viewpoint of impregnability and impregnation rate of the resin into the reinforcement fiber base. Epoxy resin, modified epoxy resin containing a thermoplastic resin component or a rubber component, nylon resin, and dicyclopentadiene resin are used preferably from the viewpoint of reducing the heat shrinkage of FRP structures and preventing cracks.

EXAMPLE 1

Figure 9:
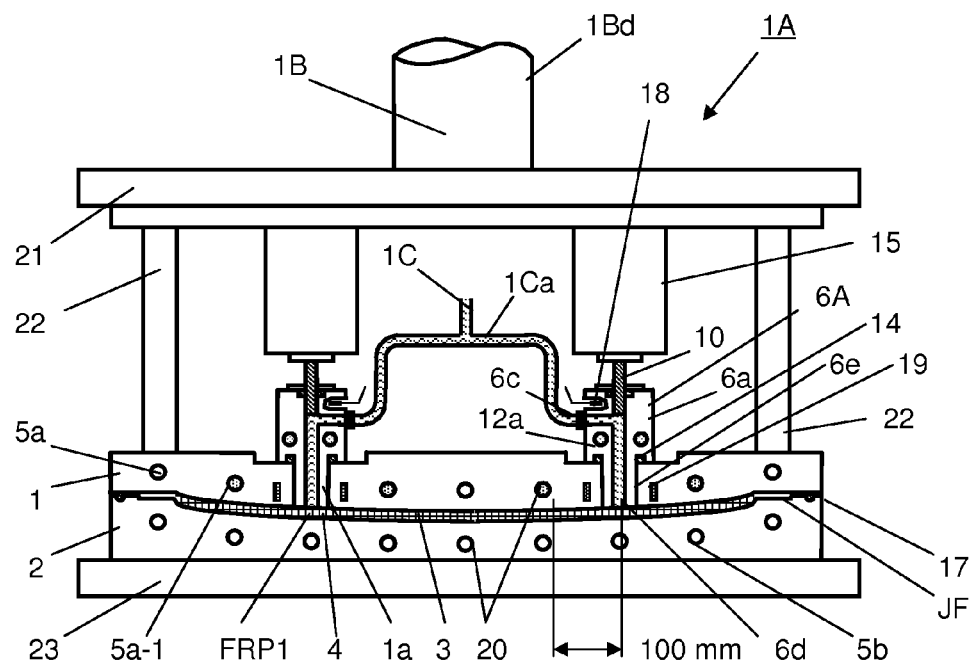
FIG. 9 is a schematic cross sectional front view of part of another embodiment of the molding die shown in FIG. 1.

FIG. 9 shows the molding die 1A used, which is the same as the molding die 1A given in FIG. 1, and additionally illustrates temperature detection apparatuses to measure the temperature of the mold 1 and temperature detection apparatuses to measure the temperature of the valve mechanisms. As the top mold 1 and the bottom mold 2 closed in the molding die 1A shown in FIG. 9, the cavity 3 is formed between the inner wall surface of the top mold 1 and the inner wall surface of the bottom mold 2. The inner wall of the top mold 1 had a gentle curved surface with a planar size of 800 mm×800 mm and a height 50 mm, and the cavity 3 had a thickness of 1.4 mm. The inner wall of the bottom mold 2 had a surface that roughly followed the shape of the inner wall surface of the top mold 1 so as to form a space for the cavity 3 having the size. Two or more through-holes were provided in the top mold 1 and the bottom mold 2 and these through-holes were used for the temperature control mechanisms 5a and 5b.

In the top mold 1, five valve mechanisms 6A were provided at roughly regular intervals. FIG. 9 shows two of the valve mechanisms 6A. The resin inlet located on the side face of each valve mechanism 6A is connected to a resin injection machine (not shown in the figures) with a nylon tube for resin supply. The lower portion of the each valve mechanism 6A (the top end portion 6e) has a cylindrical shape, and the top end portion 6e was embedded in the top mold 1 with its apical surface reaching the cavity wall. A resin discharging outlet was provided in the apical surface of the top end portion 6e. The embedded portion (the top end portion 6e) had a diameter d of 30 mm and an embedding depth h of 40 mm.

The flow channel opening-closing mechanism for each valve mechanism 6A had a piston valve and was connect to an oil hydraulic cylinder to drive its opening and closing motion. The resin flow channel was arranged so that as the piston valve was opened, resin would enter in the valve mechanism in the horizontal direction through the resin inlet located in the side face, then move down through the space to accommodate the sliding piston valve, and finally reach the resin discharging outlet. When the piston valve was closed, the piston moved down through the resin flow channel to reach the position where it became flush with the cavity wall. In this state, the space for the resin flow channel was occupied by the piston, while the section of the resin flow channel from the resin inlet to the sliding piston rod hole was left as an unoccupied space.

Two through-holes were provided under this space, and these through-holes were used for the temperature control system 12a. Cooling water supplied from an external chiller was circulated through these through-holes. The valve mechanism 6A was fixed to the top mold 1 with bolts, and an O-ring was provided between the top mold 1 and the valve mechanism 6A. A blind hole was made from outside of the valve mechanisms 6A to a position near the space, and a thermocouple 18 was installed in the blind hole to measure the temperature at the position.

The molding die was controlled so that the temperature of the cavity wall surface (the temperature measured at the mold temperature measuring position 19 on the cavity wall 100 mm away from center of the valve mechanism 6A) would be maintained at 100° C. by circulating hot water in the through-holes of the temperature control mechanisms 5a and 5b. In this state, the surface of the valve mechanism 6A exposed in the cavity 3 had a temperature of 95° C., and the thermocouple 18 installed in the valve mechanism 6A showed a temperature of 35° C.

The molding die was fixed to a lift apparatus, and the molding die was opened by lifting the upper lift unit 21. After placing a reinforcement fiber base 4 in the cavity 3, the upper lift unit 21 was lowered to close the molds. The reinforcement fiber base was a stack of four sheets of CK6252C (plain weave, unit weight of 315 g/m², reinforcement fiber T700SC-12K) supplied by Toray Industries, Inc.

A vacuum pump, which is not shown in the figures, was activated to maintain a vacuum in the cavity 3, and a resin injection machine, which is not shown in the figures, was used to supply liquid resin. Epoxy resin (TR-C35 epoxy resin supplied by Toray Industries, Inc.) was used as the liquid resin. The TR-C35 epoxy resin consisted of a base resin (jER828 epoxy resin supplied by Japan Epoxy Resins Co., Ltd.) and a curing agent (Blend TR-C35H (imidazole derivative) supplied by Toray Industries, Inc.), and the mixing ratio of the base resin and the curing agent was 10:1.

The liquid resin fed through a branched tube entered into the resin flow channel through the resin inlet located in the side face of each valve mechanism 6A and reached the flow channel opening-closing mechanism. After confirming this, the piston valve was lifted to open the flow channel. After confirming that the cavity 3 was filled with the liquid resin, the piston valve was lowered to close the flow channel. One minute was taken from the start of resin injection until the cavity 3 was filled with the liquid resin.

After maintaining this state for 17 minutes, the molding die was opened, and the fiber reinforced plastic molding produced was ejected from the molding die. In the fiber reinforced plastic molding produced, the resin had been cured after fully impregnating the reinforcement fiber base, and the molding had a high-quality surface.

Subsequently, the molding die was cleaned, and a reinforcement fiber base of the same laminate structure as in the first cycle was placed in the cavity. The molding die was closed, and a second molding cycle was carried out by the same procedure as in the first cycle. The operation time for injection of the liquid resin and the curing time required were virtually the same as in the first cycle. The fiber reinforced plastic molding ejected from the molding die had a high-quality surface as in the case of the first cycle. The time required from the ejection of the fiber reinforced plastic molding in the first cycle to the ejection of the fiber reinforced plastic molding in the second cycle was a short 22 minutes.

EXAMPLE 2

For each of the five valve mechanisms provided in the molding die used in Example 1, four cartridge heaters 20 were installed at positions 20 mm away from the hole 1a for embedding the lower portion of each valve mechanism (positions meeting the relation of L=20 mm in FIG. 7), and activated to heat the resin. Consequently, the surface of the valve mechanism 6A exposed in the cavity 3 had a temperature of 98° C. when the surface of the cavity 3 was maintained at a temperature of 100° C. The thermocouple 18 installed for the valve mechanism 6A showed a temperature of 38° C.

When injection of liquid resin was carried out under the same conditions as in Example 1, one minute was required to fill the cavity with the liquid resin. After maintaining this state for 15 minutes, the molding die was opened, and the fiber reinforced plastic molding was ejected from the molding die. The resin had been cured after fully impregnating the reinforcement fiber base, and the molding had a high-quality surface. An equivalent molding to the one in Example 1 was produced in a time shorter by 2 minutes.

Subsequently, the molding die was cleaned, and molding was carried out by the same procedure as in the first cycle. As in the case of the first molding cycle, a fiber reinforced plastic molding with a high-quality surface was produced in a short time. The time required from the ejection of the fiber reinforced plastic molding in the first cycle to the ejection of the fiber reinforced plastic molding in the second cycle was a short 20 minutes.

COMPARATIVE EXAMPLE 1

The molding die used had the same cavity shape as in Example 1, but had no valve mechanisms. As in the case of the molding die used in Example 1, hot water was passed through through-holes provided in the molding die to heat and maintain the cavity surface temperature at 100° C. A nylon tube for resin supply from a resin injection machine was connected to the resin inlet provided at the registering face JF (see FIG. 9) between two or more molds of the molding die.

A vacuum was maintained in the molding die, and the same reinforcement fiber base and liquid resin as used in Example 1 were supplied to the cavity to fill it with the liquid resin. After maintaining this state for 15 minutes, the molding die was opened, and a fiber reinforced plastic molding was obtained. In the fiber reinforced plastic molding, the resin had been cured after fully impregnating the reinforcement fiber base, and the molding had a high-quality surface.

Subsequently, the resin feed tube used for injection was disposed of after removing it from the molding die. Then the molding die was cleaned, and a similar stack of reinforcement fiber base sheets was placed in the cavity. The resin feed tube was connected to the registering face JF between the two or more molds of the molding die, and the molding die was closed to grip the tube, followed by connecting the other end of the resin feed tube to the resin inject machine. Then, a second molding was carried out by the same procedure as in the first cycle. The time required for injection and curing of the liquid resin was about the same as in the first cycle. The fiber reinforced plastic molding taken out of the molding die had a high-quality surface as in the case of the molding obtained in the first cycle. The time required from the ejection of the fiber reinforced plastic molding in the first cycle to the ejection of the fiber reinforced plastic molding in the second cycle was 30 minutes. The repeated implementation of the molding cycle required a longer time due to the additional operations for removal and disposal of the used resin feed tube and fixing of the new resin feed tube. In addition, a waste resin feed tube was left.

If the RTM process according to aspects of the present invention is used, undesirable solidification of liquid-state resin (resin in a flowable state) in the resin injection path can be prevented as the liquid-state resin is injected in the molding die for solidification of the resin in the molding die, making it possible to perform desirable smooth resin injection operations and allow smooth motions for starting and stopping the resin injection. As the solidification of the injection resin can be prevented, resin flow channels can be opened and closed without using throwaway resin feed tubes. As a result, the entire workability of the molding cycle can be improved and the productivity for production of moldings can be enhanced. It is also possible to reduce the amount of wastes including resin feed tubes used in the conventional processes.

The use of this RTM process allows the resin to be injected smoothly into the cavity of the molding die, and in the case of repeating the molding cycle, allows the tact time to be shortened, leading to a large increase in the efficiency of production of FRP moldings.

Reference Signs List
1: top mold
1A: molding die
1a: valve mechanism attaching hole
1B: mold opening-closing mechanism
1Bd: lift mechanism
1C: main pipe for resin supply
1Ca and 1Cb: branch pipe for resin supply
2: bottom mold
3: cavity
4: reinforcement fiber base
5a and 5b: temperature control mechanism
5a-1, 5a-2, and 5a-3: temperature control mechanism
6A and 6B: valve mechanism
6a: main valve device
6b: resin flow channel
6b-1: resin flow channel in horizontal direction
6b-2: resin flow channel in vertical direction
6c: inlet of resin flow channel
6d: outlet of resin flow channel
6e: top end portion of main valve device
6f: rear end portion of main valve device
6g: O-ring
10: piston
10a: piston rod hole
11: resin retention portion
12a, 12b: temperature control system
13: another temperature control system
14: O-ring
15: piston drive apparatus
17: O-ring
18: thermocouple
19: mold temperature measuring position
20: cartridge heater
21: upper lift unit
22: column
23: lower lift unit
46A: valve mechanism
d: diameter of top end portion of valve mechanism
FRP1: fiber reinforced plastic molding
h: embedding depth of top end portion of valve mechanism in mold
JF: registering face between two or more molds of molding die
L: minimum distance between top end portion of valve mechanisms and temperature control mechanism
Rm: resin in a flowable state

The invention claimed is:

1. A RTM process comprising:
using a molding die comprising
(a) two or more molds,
(b) a temperature control mechanism provided in at least one of the two or more molds to adjust a temperature of the mold,
(c) a mold opening-closing mechanism to open and close the two or more molds,
(d) a cavity between the inner walls of the two or more molds formed when the two or more molds are closed,
(e) a resin introducing path to supply a resin in a flowable state into the cavity, and
(f) a valve mechanism provided in the resin introducing path to start and stop the supply of the resin into the cavity through the resin introducing path;
(g) activating the mold opening-closing mechanism to close the two or more molds after a reinforcement fiber base is placed in the cavity;
(h) supplying the resin into the cavity from the resin introducing path through the valve mechanism after the two or more molds are closed;
(i) activating the valve mechanism to stop the supply of the resin after the supply of the resin is completed;
(j) activating the temperature control mechanism for adjustment of the temperature in the cavity so as to solidify the resin impregnated in the reinforcement fiber base placed in the cavity; and
(k) activating the mold opening-closing mechanism to open the two or more molds after the solidification of the resin is completed to allow a molded fiber reinforced plastic molding comprising the reinforcement fiber base and the resin to be ejected from the molding die;
wherein
(l) a plurality of said valve mechanisms are provided in the molding die,
(m) one or more temperature control systems are provided for each of the valve mechanisms to adjust the temperature of the valve mechanisms, and
(n) the resin in a flowable state is supplied to the cavity through the valve mechanisms, and
wherein a top end portion of each of the valve mechanisms is embedded in one of the molds, wherein the resin introducing path leading to the cavity via the valve mechanism passes through the mold so that the resin introducing path has its open end in an inner wall surface of the cavity, and wherein at least one of the one or more temperature control systems provided for the valve mechanism is located between a resin retention portion of the resin introducing path in which the resin, in a flowable state, is retained during the period when the resin is not flowing through the resin introducing path, and the portion of the valve mechanisms embedded in the molding die, and further wherein the temperature control system located between the resin retention portion and the portion of the valve mechanisms embedded in the molding die causes the temperature controlling medium to flow through a temperature controlling medium flow channel provided in the valve mechanism so that the temperature of the valve mechanism is controlled by the temperature controlling medium.

2. The RTM process according to claim 1, wherein a temperature controlling medium flows continuously in at least one of the one or more temperature control systems provided for each of the valve mechanisms to keep the resin remaining in the resin introducing path in a flowable state while the resin in the cavity is solidified.

3. The RTM process according to claim 1, wherein the top end portion of the valve mechanism is provided with another temperature control system and the another temperature control system serves to heat the valve mechanism.

4. The RTM process according to claim 1, wherein the diameter d and the depth h of the top end portion of the valve mechanism meet the following relation:

$d \leq h.$

5. The RTM process according to claim 1, wherein the two or more valve mechanisms can be opened and closed independently.

6. The RTM process according to claim 1, wherein the temperature control mechanisms provided in the molding comprises a temperature control mechanism provided around the top end portion of the valve mechanism and a temperature control mechanism provided on a portion of the valve mechanism other than the top end portion of the valve mechanism, each temperature control mechanism being controlled by a different control system.

7. The RTM process according to claim 6, wherein the temperature control mechanisms provided around the top end portion of the valve mechanism is arranged to surround the top end portion of the valve mechanism.

8. The RTM process according to claim 1, wherein the temperature control mechanisms provided in the molding die are arranged so that their distances, L, from the interface between the top end portion of the valve mechanism and the mold meet the following relation:

$L \leq 30$ mm.

9. The RTM process according to claim 1, wherein two or more of the resin introducing paths are connected to the same resin supply source and a resin temperature control mechanism is provided in each of the two or more resin introducing paths to adjust the resin temperature to a value higher than the temperature of the resin entering the cavity so that the resin in the resin introducing paths is properly controlled by the resin temperature control mechanisms.

10. The RTM process according to claim 1, wherein the reinforcement fiber base is in the form of a sheet.

11. The RTM process according to claim 1, wherein the reinforcement fiber base has a core in its interior.

12. The RTM process according to claim 1, wherein a media for forming a resin flow channel in the cavity is provided between the reinforcement fiber base and the position of the open end of the resin introducing path in the inner wall surface of the mold.

13. The RTM process according to claim 12, wherein the media has a thickness of 0.2 to 1 mm.

* * * * *